United States Patent

Ghisler et al.

[11] Patent Number: 6,118,982
[45] Date of Patent: Sep. 12, 2000

[54] METHOD AND ARRANGEMENT IN A MOBILE UNIT

[75] Inventors: Walter Ghisler, Upplands Väsby; Anders Khullar, Bjärred, both of Sweden

[73] Assignee: Telefonaktiebolaget LM Ericsson, Stockholm, Sweden

[21] Appl. No.: 08/836,346

[22] PCT Filed: Nov. 3, 1995

[86] PCT No.: PCT/SE95/01301

§ 371 Date: May 12, 1997

§ 102(e) Date: May 12, 1997

[87] PCT Pub. No.: WO96/16523

PCT Pub. Date: May 30, 1996

[30] Foreign Application Priority Data

Nov. 18, 1994 [SE] Sweden .................................. 9404002

[51] Int. Cl.[7] ...................................................... H04B 17/00
[52] U.S. Cl. ........................................ 455/67.4; 455/425
[58] Field of Search .................................. 455/67.1, 67.4, 455/67.7, 115, 226.1, 423, 425, 424; 379/357

[56] References Cited

U.S. PATENT DOCUMENTS 4,554,410 11/1985 Furumoto .
5,201,063 4/1993 Tam et al. .............................. 455/67.4
5,469,494 11/1995 Perez et al. ............................. 379/27

FOREIGN PATENT DOCUMENTS 2 232 850 12/1990 United Kingdom .

OTHER PUBLICATIONS

Patent Abstracts of Japan, "Maintenance Device for Mobile Telephone System", Publication No. JP 1016054 A (NEC CORP.), vol. 13, No. 87, E–754, Jan. 19, 1989.

Primary Examiner—Nguyen Vo
Attorney, Agent, or Firm—Burns, Doane, Swecker & Mathis, L.L.P.

[57] ABSTRACT

A method and an arrangement for automatically monitoring a mobile telephone unit (ME) on the occurrence of at least one predetermined event in the mobile telephone unit (ME), for instance a call release. The method comprises the steps of: storing at least one monitoring program in a program generator (PRG) in the mobile unit (ME); storing in a comparison circuit (CC) in the mobile unit (ME) signal patterns representative of different types of trigger signals (TSI); sending a trigger signal (TSI) from a trigger device (TA) in the mobile unit to the comparison circuit (CC), the trigger signal (TSI) being contingent on the occurrent event; comparing the trigger signal (TSI) with the signal patterns; selecting a monitoring program according to the result of the comparison; and executing the selected monitoring program in the mobile unit (ME).

11 Claims, 8 Drawing Sheets

METHOD AND ARRANGEMENT IN A MOBILE UNIT

TECHNICAL FIELD

The present invention relates to a method of continuously monitoring a mobile telephone unit. The invention also relates to an arrangement for carrying out the method.

BACKGROUND ART

It is known in mobile telephone technology to test the function of mobile telephone units, both during their manufacturing phase and when the units are operational. For instance, it is known to test the function of a mobile unit during its manufacturing phase with the aid of external measuring equipment. Since this type of testing requires the use of heavy and often permanently installed measuring equipment, the method cannot be applied when the mobile unit is operational.

The U.S. Pat. No. 4,554,410, for instance, teaches a method of testing an operational mobile unit, by manually activating a test program. A self-testing program can be activated in the mobile unit by depressing a key on the unit. Different tests can be run, depending on which key is depressed. According to the patent, the result of an executed self-test program can be displayed on the mobile unit. One drawback with this type of test is that it requires the presence of a user or of some other person, for instance a service technician. Since activation of the test requires the presence of a person, the mobile is often tested less frequently than would otherwise be desirable. Neither is the user always aware of the most favourable occasion for activating a test, i.e. an occasion in which the most relevant and optimal result can be obtained. Another drawback with the solution presented in the U.S. patent is that the test is only activated in the mobile unit when the user suspects that the mobile is faulty or at error. However, the most critical errors in a mobile unit are often caused by interference in the surroundings, a fact of which the user is normally unaware. For instance, it is possible that a mobile station does not release itself when a call has been terminated, or that a mobile in a TDMA system transmits on non-allocated frequencies or transmits in wrong time slots. Operators have traditionally contended with these faults and errors with the aid of direction-finding vehicles which localize interfering mobile stations. Localization of interfering mobile stations is both complicated and expensive.

It is also known from Ericsson's published product description of subscriber line testing described in SULTRC 1551-cnt2161293, SULTR 1551-cnt2161294 and SULTD 1551-cnt2161328 a procedure in which a subscriber line and terminal is tested with a starting point from a telephone switching centre or exchange subsequent to the release of a wire-bound call. However, this test requires a test initiating device to be positioned centrally in the switching centre, or exchange.

It is also known that personal computers carry out time-consuming self-test procedures when started up. However, such testing procedures cannot be applied with mobile telephones, since it is unacceptable to a user of a mobile telephone that he/she should wait for a self-test to be run in conjunction with establishing a call connection, the setting-up of which connection is often ordered immediately after the mobile has dialled a telephone number.

SUMMARY OF THE INVENTION

The present invention refers to the problem of monitoring continuously the function of a mobile telephone unit. The monitoring procedure can be carried out without any disturbing effect on a user of the mobile, i.e. regular monitoring can be carried out without requiring the user of the mobile to react and without causing any delay in the establishment of a call connection, for instance.

According to the invention, the problem referred to is solved by automatically activating a monitoring program in the mobile subsequent to the occurrence of predetermined events, such as a calling-subscriber release, for instance. According to the invention, procedures are also followed automatically in the mobile in accordance with the result of the monitoring program. The prevention of radio-signal transmissions is one example of a procedure that can be undertaken. The invention also relates to an arrangement for carrying out the method.

The invention thus solves the problem of monitoring the function of a mobile unit regularly and automatically. This is achieved by activating a trigger signal in the mobile unit subsequent to the occurrence of certain predetermined events, for instance subsequent to a calling-subscriber release. According to the invention, the signal is used to start a testing program which generates a resultant signal. The resultant signal is compared with a desired resultant signal and procedures are automatically taken in the mobile unit in accordance with the result of the comparison, for instance the mobile may be shut down if it interferes with some other equipment. The aforedescribed process is made possible by an arrangement which includes means for activating the trigger signal in the mobile unit. The arrangement also includes means for selecting a testing program which carries out the test, and means for generating the resultant signal. The arrangement also includes means for comparing the resultant signal with the desired resultant signal and carrying-out procedures in the mobile unit automatically in accordance with the comparison.

An object of the present invention is thus to monitor a mobile unit regularly with the intention of ascertaining whether or not the mobile has a disturbing influence on another user or on the surroundings. Another object of the invention is to monitor the mobile automatically with the intention of liberating the user from monotonous and often occurring working procedures, so that important tests will not be avoided. A further object of the invention is to make the user aware that the mobile is afflicted with an error or a fault, for instance by showing the nature of the error or fault automatically on a display DISP on the mobile unit. Still another object of the invention is to prevent the mobile from having a disturbing effect on the surroundings. This is achieved, for instance, by automatically shutting down the transmitter of the mobile unit.

The invention provides the important advantage of enabling mobile units to be tested without actively involving the user or other persons, for instance service technicians. Another advantage afforded by the invention is that testing can be carried out without the aid of external measuring instruments. Still another advantage afforded by the invention is that tests can be arranged to be carried out subsequent to certain given events. The most relevant and optimal test results are achieved thereby, for instance testing as to whether the transmitter can transmit within prescribed time intervals after a subscriber-call release. Tests can also be prevented from taking place at unsuitable times, for instance after power on. Since switching on of the mobile is often followed by the establishment of a call connection, a time-consuming test would be unsuitable after the mobile has switched on. Another advantage afforded by the invention is that faults and errors can be rectified immediately as they
} occur, which is particularly beneficial in respect of faults or errors that have a disturbing influence on the surroundings.

The invention will now be described in more detail with reference to preferred embodiments thereof and also with reference to the accompanying drawings.

DESCRIPTION OF PREFERRED EMBODIMENTS

Figure 1:
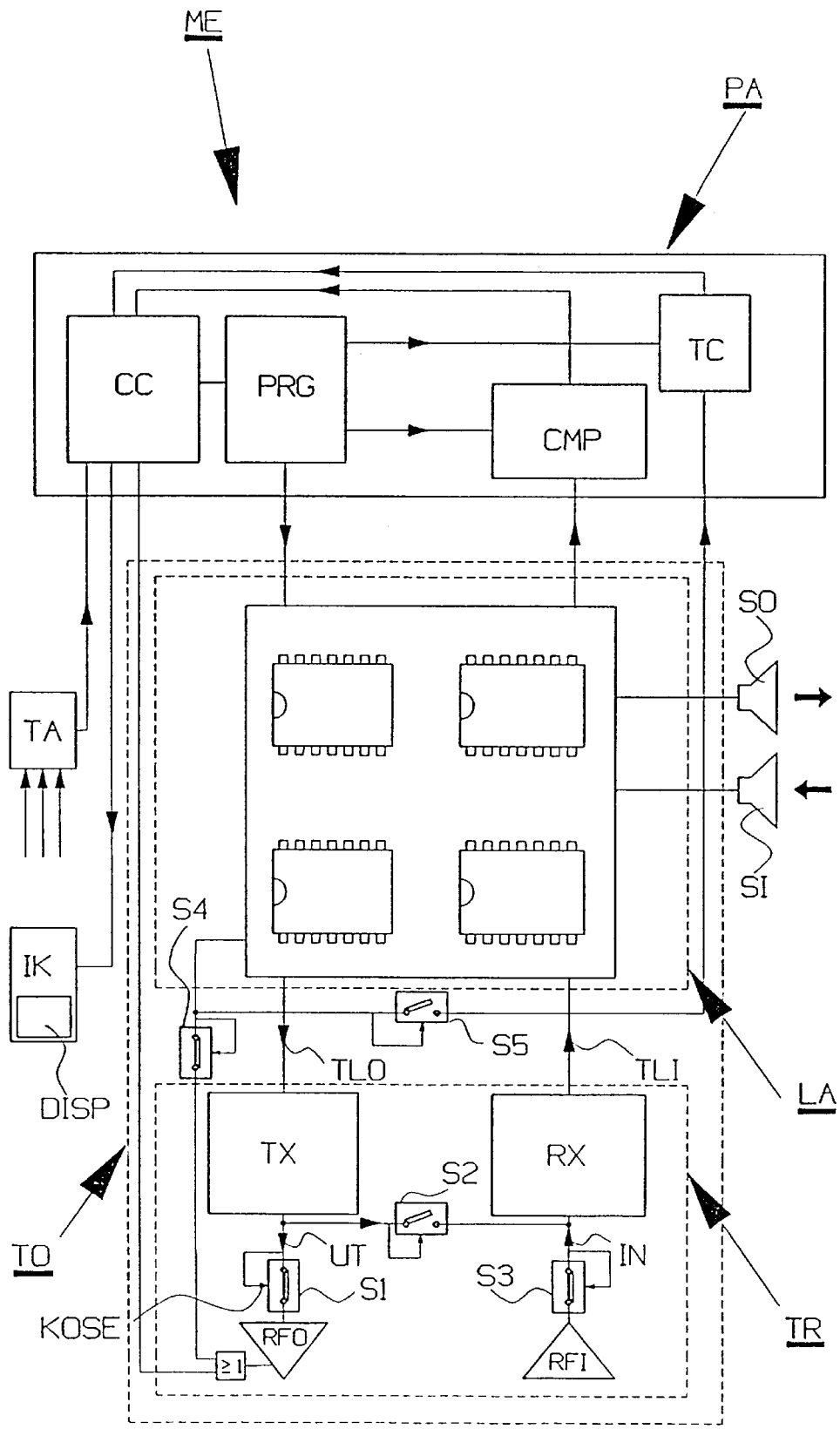
FIG. 1 is a block schematic illustrating a mobile telephone unit which includes a test arrangement and a test object.

FIG. 1 illustrates a mobile telephone unit ME, which in the illustrated case is a mobile telephone although it may alternatively be some other form of mobile unit, for instance a mobile radio communications computer, with which the inventive concept can be applied. The mobile telephone unit ME includes a test object TO and a testing arrangement PA. The test object TO in FIG. 1 includes a logic device LA and a transceiver TR. The logic device LA includes mainly digital circuits, for instance customer-adapted circuits, so-called ASICs. The manner in which the logic device and the transceiver operate will be described immediately hereinafter with reference to a standard call. The digital components of the logic device LA handle speech from a mobile user, this speech arriving at the mobile via a microphone SI. Audio signals from/to the user transmitted to the microphone SI and from a loudspeaker SO respectively have been marked with solid arrows in FIG. 1. Speech handling in the logic device LA includes signal processing after A/D-conversion. Signal processing includes time adaptation of the signal and the arrangement of check bits therein. This type of signal processing is considered to be well known to one of normal skill in this particular field and will not therefore be described in detail. Data signals can also be processed in addition to speech signals. However, only the designation speech signal is used in the description of this embodiment. The transceiver TR in the test object TO includes a transmitter part TX which is connected to the logic device LA. The transmitter part TX receives a speech signal from the logic device LA and D/A converts and modulates the incoming speech signal in accordance with an agreed standard. The standard may be a GSM standard (Global System for Mobile communication). The type of standard applied has no significance to the concept of the invention and will not therefore be described in great detail. The modulated speech signal is directed to the desired destination with the aid of three switches, here referred to as the first, the second and the third switch S1, S2 and S3 respectively. A signal from the logic device LA is directed to the desired destination with the aid of two other switches, here referred to as the fourth and the fifth switch S4 and S5. The functions of the five switches S1, S2, S3, S4, S5 will be described in more detail below in conjunction with the description of the inventive methods of procedure. In the case of the FIG. 1 embodiment, the transmitter part TX is connected to an outgoing radio-frequency output RFO. The radio-frequency output RFO converts the modulated signal UT to radio waves which are transmitted to a radio signal receiver, for instance base stations in the telecommunications system, via an antenna. Neither the antenna nor the base stations are shown in FIG. 1. The transceiver TR also includes a radio signal receiver RFI which receives radio waves from a base station and converts the radio waves to a modulated signal IN of the same standard type as that mentioned above with reference to the transmitter part TX. In the FIG. 1 embodiment, the radio signal receiver RFI is connected to a receiver part RX which includes a demodulator. In order to prevent cross-talk interference during an ongoing call, the receiver part RX may be set to receive signals of a different carrier frequency than the carrier frequency used by the transmitter part TX of the mobile for transmission. The receiver part RX demodulates the modulated signal IN received from the radio signal receiver RFI to a speech signal TLI which, after A/D conversion, is sent to the logic device LA. The speech signal is processed in accordance with a method known to the person skilled in this art and, after D/A conversion, is sent to the earlier-mentioned loudspeaker SO. As before mentioned, the mobile ME also includes a testing arrangement PA. The testing arrangement PA includes a control circuit CC, a program generator PRG, a comparison circuit CMP and a test circuit TC. The control circuit CC is connected to the program generator PRG, the comparison circuit CMP and the test circuit TC. The control circuit CC is also connected to the test object TO, a trigger device TA and an indicator IK in the mobile telephone. Although the latter two components TA and IK are mounted in the mobile telephone, they are located externally of the testing arrangement PA in the case of the illustrated embodiment. The comparison circuit CMP and the test circuit TC are connected to the program generator PRG and also to the test object TO. Mutual signalling between the component parts CC, PRG, CMP and TC in the testing arrangement PA, and signalling between the testing arrangement PA and the remaining signal nodes TA, IK and TO will be described further on in conjunction with a description of following embodiments. In the illustrated case, the mobile unit is digital, for instance of the TDMA-type (Time Division Multiple Access) although other types are conceivable, for instance FDMA (Frequency Division Multiple Access) or CDMA (Code Division Multiple Access). Signalling between the signal nodes is illustrated in FIG. 1 with the aid of thin full lines. Arrows used in conjunction with the full lines indicate signalling directions.

Figure 2:
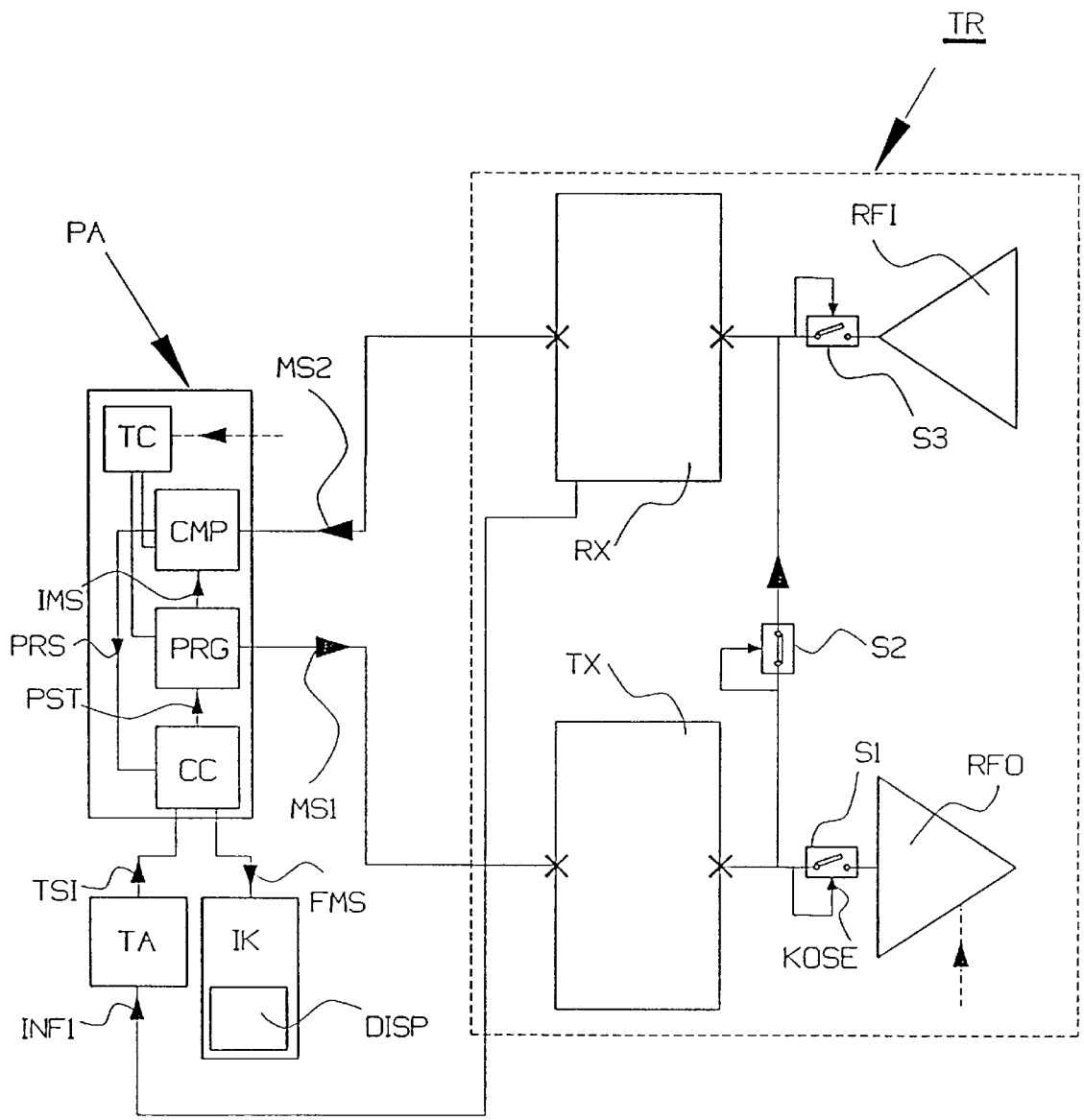
FIG. 2 is a block schematic illustrating that part of the mobile telephone unit which is affected when testing a transceiver.

FIG. 2 illustrates schematically that part of the mobile unit ME which is used in an inventive method. The function of the parts shown in FIG. 2 used when carrying out the method are described briefly below, after which the. The inventive method is described in detail. FIG. 2 shows the control circuit CC in the testing arrangement PA mentioned above with reference to FIG. 1. The control circuit CC functions to coordinate control signals as the method is carried out. The control circuit CC is connected to the trigger device TA, which in the case of the illustrated embodiment includes bit error monitoring means. The monitoring of bit errors in incoming radio signals form part of conventional mobile telephony technology and will not therefore be described in great detail. The control circuit CC is connected to an indicator IK, which in the present case includes a digital display DISP on which a message can be displayed to the user. In accordance with the inventive method, the program generator PRG functions to generate a test program which is used to test the mobile unit ME. In the application of the method, the comparison circuit CMP functions to mutually compare two signals. The functions of the aforesaid components will be described in more detail further on.

That part of the aforesaid transceiver TR used in the inventive method is shown in FIG. 2. The transmitter part TX includes a signal input and a signal output. When practicing the method, the transceiver part functions mainly to modulate signals incoming to the transmitter part. The transceiver part RX also includes a signal input and a signal output. When practicing the method, the receiver part RX functions to demodulate signals incoming to the receiver part RX. Communication between the transmitter part TX and the outgoing radio-frequency output RFO, and between the receiver part RX and the incoming radio signal receiver RFI is prevented with the aid of the switches S1 and S3. A choice between establishing or releasing a connection between the transmitter part TX and the outgoing radio-frequency output RFO is made with the aid of the first switch S1. A choice between establishing or releasing a connection between the transmitter part TX and the receiver part RX can be implemented with the aid of the second switch S2. The switch S2 is shown schematically in the Figure as a conventional switch and may include a frequency converter which, during testing, converts a frequency transmitted from the transmitter part TX to another frequency suitable for reception in the receiver part RX. In the present case, this conversion is carried out because the receiver part RX is set to a frequency different to that of the transmitter part TX, as mentioned above. This frequency conversion has no significance with regard to the inventive concept and will not therefore be described in great detail. A system is also conceivable in which the transmitter part transmits on the same frequency as that received in the receiver part. A choice between establishing or releasing a connection between the radio signal receiver RFI and the receiver part RX can be implemented with the aid of the third switch S3. The switches S1, S2 and S3 are activated to establish or release a connection with the aid of control bits in a so-called control sequence KOSE in the signal UT transmitted from the transmitter part TX. This is shown schematically in FIG. 1 with the aid of arrow locations which symbolize the influence of the control sequence KOSE on the switches. The control sequence KOSE is digital and is transmitted on own conductors without being modulated. However, for the sake of simplicity, the control sequence is nevertheless described as part of the signal UT. The function of the aforedescribed components and the influence of the control sequence KOSE will become more apparent from the description of the inventive method as now described with reference to FIG. 2.

FIG. 2 illustrates signalling in the inventive method. The solid arrows drawn in FIG. 2 on the connections between the earlier described signal nodes illustrate the signalling direction between the nodes. The nodes may, for instance, be the program generator PRG in the testing arrangement PA and the transmitter part TX in the transceiver in the transceiver TR. The method illustrated with the aid of FIG. 2 includes testing the transmitter part TX and the receiver part RX. It is particularly important to carry out a test of this nature after, for instance, exceeding a predetermined maximum value of the number of bit errors that can be thought to originate from the mobile unit. The inventive method comprises the following steps:

Storing in the control circuit CC signal patterns which include signal patterns for different types of trigger signals that can occur in accordance with the illustrated example, for instance exceeding the maximum permitted number of bit errors. The control circuit includes a memory unit in which the different signal patterns are stored. When the control circuit receives a trigger signal TSI, the trigger signal is compared with the contents of the memory unit and there is selected a preprogrammed program which corresponds to the signal pattern in the memory unit that coincides with the incoming trigger signal. This will be described in more detail further on. The method assumes that a maximum permitted value is determined for a number of bit errors in a signal processed in the receiver part and generated in a telephone call between two users in a predetermined time period. According to the present embodiment, the maximum permitted value stored in the trigger device TA has been determined manually as 5%. The method then comprises the following further steps:

Setting-up a telephone call by establishing a connection between the mobile ME and another telephone unit.

Transmitting from the receiver part RX to the trigger device TA a bit information signal INF1 containing information relating to the number of bit errors. According to the present embodiment, the number of bit errors corresponds to 6%.

Terminating the telephone call, wherein the users break the established connection manually and the call is released.

Transmitting a trigger signal TSI from the trigger device TA to the control circuit CC in the testing arrangement PA. In the case of the present embodiment, the trigger device TA includes means which enables the number of bit errors from the call to be compared with the permitted value. The trigger signal TSI is activated after establishing in the trigger device TA that the maximum permitted number of bit errors has been exceeded, as earlier mentioned.

Making a comparison in the control circuit CC between the trigger signal TSI and the earlier-mentioned signal patterns.

Establishing in the control circuit CC agreement between the trigger signal TSI and the signal pattern for bit error monitoring.

Transmitting a program start signal PST from the control circuit CC to the program generator PRG. The program start signal PST includes a start order to the program generator PRG commanding the generator to execute a preprogrammed program intended for testing the transmitter and receiver parts TX and RX.

The following method steps are intended as an illustrative example of a testing procedure that can be suitably carried out after having established that the maximum number of permitted bit errors has been exceeded. The testing procedure defined in the following method steps does not claim to embrace in detail a complete testing procedure, but shall be seen merely as a means of providing a better understanding of the inventive concept:

Transmitting a predetermined ideal signal IMS from the program generator PRG to the comparison circuit CMP. In more general terms, the ideal signal IMS can be referred to as a reference signal or "set-point signal". The ideal signal IMS is later used in a comparison procedure which will be explained in more detail further on.

Storing the ideal signal IMS in the comparison circuit CMP.

Creating a first structure signal MS1 in the program generator PRG. The first structure signal can be referred to more generally as an object signal. The first structure signal MS1 includes a predetermined bit pattern which is well-suited for carrying out the testing procedure selected. The predetermined bit pattern in the first structure signal MS1 includes the earlier-mentioned control sequence KOSE. The control sequence KOSE, which is placed in that part of the total first structure signal MS1 which is transmitted first, influences the switches S1, S2 and S3 in a manner which will be made apparent in the following description.

Transmitting the first structure signal MS1 from the program generator PRG to the signal input of the transmitter part TX.

Modulating the first structure signal MS1 in the transmitter part TX. In the case of the illustrated embodiment, modulation is effected in a manner which will adapt the signal to a format suitable for signalling in a GSM system.

Transmitting the modulated first structure signal MS1 from the signal output of the transmitter part.

The earlier-mentioned control sequence KOSE causes the first switch S1 to interrupt the signal and adopt the state shown in FIG. 2.

The control sequence KOSE causes the second switch S2 to close, as shown in FIG. 2.

The control sequence KOSE causes the third switch S3 to break the signal, as shown in FIG. 2.

Transporting the first structure signal MS1 from the signal output of the transmitter part TX to the signal input of the receiver part RX.

Demodulating the first structure signal in the receiver part RX. In order to show more clearly that the content of the first structure signal MS1 may have been changed in passing through the different signal nodes TX and RX, the first structure signal MS1 is hereinafter designated a second structure signal MS2. The second structure signal may be referred to generally as an object evaluating signal.

Sending the second structure signal MS2 from the signal output of the receiver part RX to the comparison circuit CMP in the testing arrangement PA.

Making in the comparison circuit CMP a comparison between the second structure signal MS2 and the earlier stored aforementioned ideal signal IMS.

Transmitting a product signal PRS from the comparison circuit CMP to the control circuit CC. The product signal PRS is contingent on the result of the comparison made in the preceding step.

The inventive method then comprises the following further steps:

Evaluating the product signal PRS in the control circuit CC. In this embodiment, it is elected that the product signal disagrees with the second structure signal MS2 and the ideal signal IMS.

Transmitting an error message signal FMS from the control circuit CC to the error indicator IK.

Displaying an error message on the error indicator. In the case of the present embodiment, the error message is "TR-ERROR".

Figure 3:
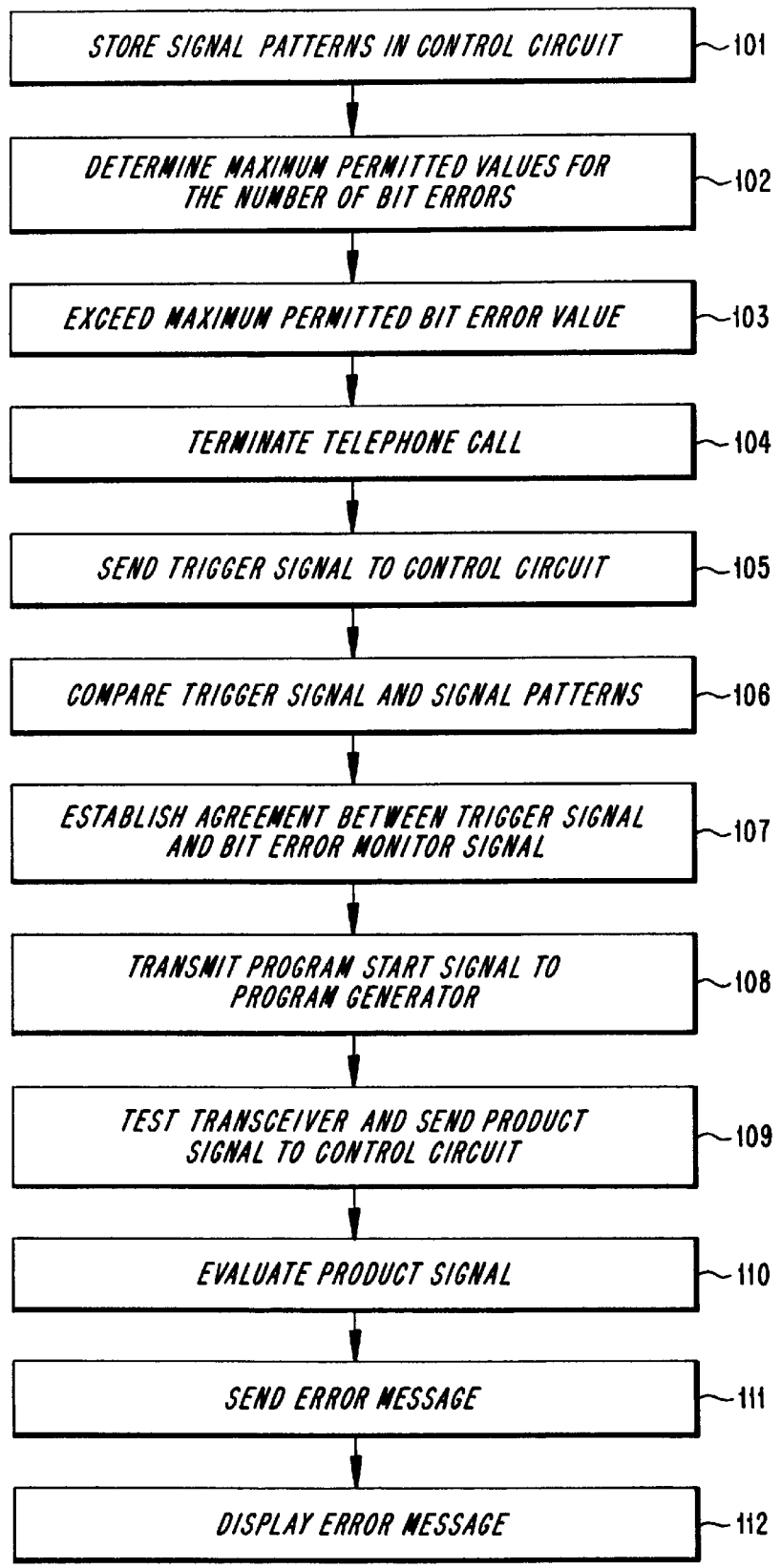
FIG. 3 is a flow sheet illustrating the procedure carried out in accordance with the invention when testing the transceiver.

FIG. 3 is a flow sheet which illustrates the inventive signalling method. The flow sheet and the following simplified description of the method are intended to be taken together with FIG. 2 and the text associated therewith. The flow sheet illustrates the steps that are most essential to the inventive concept. The method will now be described with reference to FIG. 3 comprises the steps of:

Storing in the control circuit CC signal patterns which include signal patterns for different types of trigger signals, in accordance with block 101.

Determining in the mobile a maximum permitted value for the number of bit errors, in accordance with block 102.

Exceeding said maximum value during a telephone call, in accordance with block 103.

Terminating the telephone call, in accordance with block 104.

Sending the trigger signal TSI from the trigger device TA to the control circuit CC in the testing arrangement PA. The trigger signal TSI is activated after establishing in the trigger device TA that the maximum permitted number of bit errors has been exceeded, in accordance with block 105.

Making a comparison in the control circuit CC between the trigger signal TSI and the earlier-mentioned signal patterns, in accordance with block 106.

Establishing in the control circuit CC agreement between the trigger signal TSI and the bit-error monitoring signal pattern, in accordance with block 107.

Transmitting the program start signal PST from the control circuit CC to the program generator PRG. The program start signal PST includes start commands for testing the transmitter part and the receiver part TX and RX, in accordance with block 108.

Testing the transceiver TR with the aid of the structure signals. After testing, the product signal PRS is sent to the control circuit CC, in accordance with block 109.

Evaluating the product signal PRS in the control circuit CC, in accordance with block 110.

Sending the error message signal FMS from the control circuit CC to the error indicator IK, in accordance with block 111.

"TR-ERROR" is shown on the display DISP on IK, in accordance with block 112.

Figure 4A:
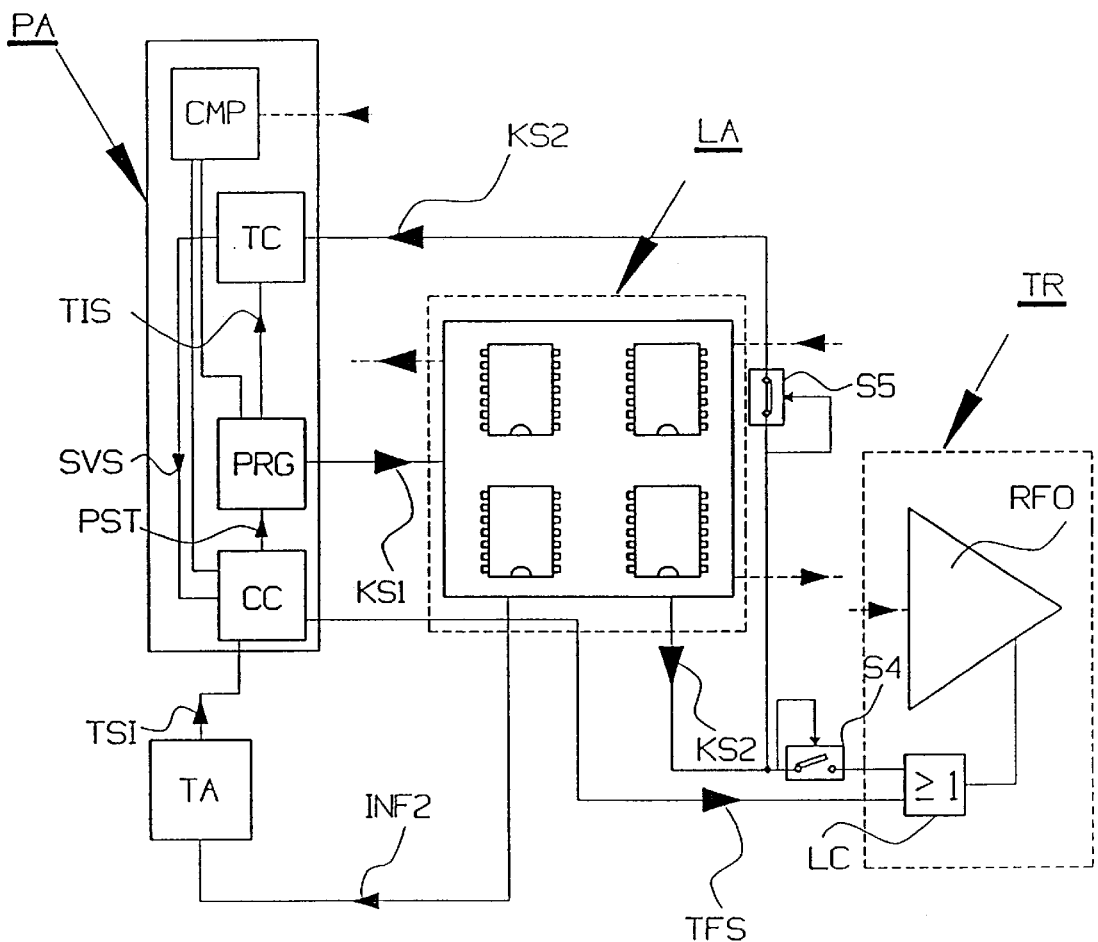
FIG. 4a is a block schematic illustrating that part of the mobile telephone unit which is affected when testing the time relationship of a signal in a time slot.
Figure 4B:
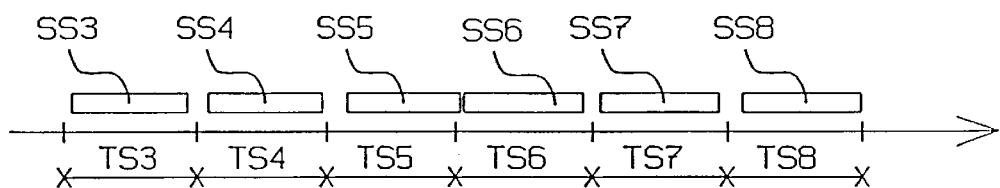
FIG. 4b is a diagram illustrating the position of messages in different time slots when transmitting from a mobile to a base station.

FIG. 4a illustrates schematically that part of the earlier described unit ME which is used in a second method according to the invention. In this embodiment, the mobile unit is a so-called TDMA mobile. According to the TDMA concept (Time Division Multiple Access), the mobile transmits radio signals to and receives radio signals from a base station in certain predetermined time slots, and the transmitted speech is coded digitally. A TDMA system of, e.g., the GSM type (Global System for Mobile communication) contains eight time slots in which a base station is able to transmit messages to and receive messages from different mobiles. FIG. 4b illustrates how different signal sequences SS3–SS8 from different mobile units are placed in different time slots TS3–TS8. Only six of the eight time slots are shown in the Figure. The inventive method will be apparent from the following text and comprises testing the ability of the mobile unit to transmit its radio signals, i.e. signal sequences SS5, within the time slot TS5 allocated to the mobile. If the mobile transmits in a wrong time slot, this will have a disturbing effect on other mobiles. The function of those parts in the mobile according to FIG. 4a used in the method will be described briefly below. This will be followed by a detailed description of the inventive method.

FIG. 4a shows the earlier-mentioned testing arrangement PA. The testing arrangement PA includes the control circuit CC, the program generator PRG and the test circuit TC. The control circuit CC is connected to both the program generator PRG and to the test circuit TC. The program generator PRG and the test circuit TC are connected to one another. The function of the test circuit TC in the method is to compare the propagation of an incoming signal in time with a predetermined propagation interval stored in the test circuit TC. The trigger device TA is connected to the control circuit CC. In the case of the illustrated embodiment, the trigger device TA includes means for monitoring a change in operator, i.e. monitoring the time when a change is made in telephone operators who handle the telephone services. The control circuit CC is also connected to the earlier described radio-frequency output RFO. This connection will be explained in more detail further on. The logic circuit LC is shown schematically in FIG. 4a with the aid of a so-called "Or-gate" symbol between the control circuit CC and the radio-frequency output RFO and includes means for delivering signals to the radio-frequency output from either the control circuit CC or the logic device LA. When at least one of the two logic circuit inputs receives a message which orders the radio-frequency output to be switched-off, an output signal is sent from the logic circuit LC to the radio-frequency output RFO. The radio-frequency output therewith prevents the transmission of radio signals. It should be pointed out that FIG. 4a, and also earlier described Figures, are schematic illustrations of the mobile unit, and do not claim to be correct drawings of the function of a mobile telephone.

FIG. 4a illustrates that part of the test object TO which is used in the inventive method. The test object TO includes the earlier-mentioned logic device LA. The function of the logic device LA with regard to controlling radio signals in a normal case, i.e. not during a test period but, e.g., during a telephone call, will be described first with reference to FIG. 1. During a telephone call, the radio signal receiver RFI receives a control message from the earlier-mentioned base station in the telecommunications system, via the antenna. The control message includes a command to the mobile ME to send messages to the base station within the specified time slot TS5. As before mentioned, a TDMA system of the GSM type (Global System for Mobile communication) has eight time slots in which messages can be transmitted from the mobile to the base station. After receiving the control message, the message is transported from the radio signal receiver RFI to the logic device LA, via the receiver part RX. The control message is processed in the logic device LA which causes the radio-frequency output RFO to transmit at the correct point in time, in accordance with the indicated time slot, i.e. within the indicated time slot TS5 without overlapping adjacent time slots. After being modulated in the transmitter part TX, the message generated during the telephone call is sent to the base station in the time slot earlier pointed out. This type of time adaptation is well-known to the person skilled in this art and will not therefore be explained in more detail. Testing of the ability of the logic device LA to adapt the radio-frequency output to a predetermined time slot will be described later in conjunction with the description of the inventive method. FIG. 4a illustrates two switches, the fourth switch S4 and the fifth switch S5. A choice as to whether to set-up or to release a connection between the logic device LA and the logic circuit LC is implemented with the aid of the fourth switch S4. A choice as to whether to make or break a connection between the logic device LA and the test circuit TC in the testing arrangement PA is implemented with the aid of the fifth switch S5. The switches are activated to set-up or to break a connection with the aid of control bits in the aforementioned control sequence KOSE sent from the logic device LA. This activation of the switches will be explained in more detail further on in the text. The output of the logic circuit LC is connected to the radio-frequency output RFO. A command to stop the transmission of radio signals arriving at the logic circuit LC from either the control circuit CC or the logic device LA, causes the radio-frequency output RFO to prevent the transmission of radio signals to the base station. In other words, it is possible to control the radio-frequency output RFO from both the control circuit CC and from the logic device LA. The manner in which the aforesaid components operate will be made apparent in conjunction with the following description of the method, made with reference to FIG. 4a.

FIG. 4a illustrates the signalling in the inventive signalling method. The signalling direction between the aforesaid signal nodes are shown by solid arrows drawn on the connections between said nodes. Examples of signal nodes are the program generator PRG in the testing arrangement PA and the logic device LA. The method now described in more detail with reference to FIG. 4a comprises controlling radio signals that are transmitted from the mobile in the correct time slot with no leakage into other, adjacent time slots. This type of testing is particularly important when a change of operator takes place, for instance. The method comprises the following steps:

Storing in the control circuit CC signal patterns which include signal patterns for different types of trigger signals that can occur in the illustrated embodiment.

Sending an operator change signal INF2 from the logic device LA, wherein it is established in the trigger arrangement TA that a change of operator has taken place.

Sending a trigger signal TSI from the trigger device TA to the control circuit CC in the testing arrangement PA. According to the illustrated embodiment, the trigger signal TSI is triggered after establishing in the trigger device TA that the mobile has changed operator.

Making a comparison in the control circuit CC between the trigger signal TSI and the signal patterns for the different types of trigger signals.

Establishing in the control circuit CC agreement between the trigger signal TSI and the operator-change signal pattern.

Sending a program start signal PST from the control circuit CC to the program generator PRG. The program start signal PST includes start commands to the program generator PRG to execute a program for testing the ability of the logic device to adapt the transmission of radio signals from the mobile to the base station within a predetermined time slot, in the illustrated case the time slot TS5.

The following method steps illustrate testing that is suitably carried out after establishing that a change of operator has taken place, in accordance with the invention. The testing method described in the following method steps does not claim to embrace a complete testing procedure in detail, but is merely intended to enable the inventive concept to be more easily understood:

Generating a control signal KS1 in the program generator PRG. The control signal KS1 resembles the aforesaid control message which is sent from the base station during a call, with the intention of informing the mobile of the time slot in which it shall communicate with the base station. According to this embodiment, the control signal KS1 includes information instructing the mobile to transit in time slot number five, TS5.

Transmitting the control signal KS1 from the program generator PRG to the logic device LA.

Sending a time interval signal TIS from the program generator PRG to the test circuit TC. The time interval signal marks where transmission shall take place, i.e. within the limits of time slot 5 TS5, as marked in FIG. 4b. The interval signal TIS is later used to ascertain that the mobile transmits in the correct time slot.

Processing the control signal KS1 in the logic device LA. In this regard, the logic device generates a time evaluating signal KS2 whose function is to control the radio-frequency output RFO for transmission in the correct time slot.

The time evaluating signal KS2 is sent from the logic device LA. The signal KS2 also includes the earlier-mentioned control sequence KOSE. The control sequence is placed in that part of the evaluating signal KS2 which is sent first from the logic device LA. The control sequence KOSE actuates the switches S4 and S5 in a manner which will be apparent from the following method steps.

The control sequence causes the fourth switch S4 to break.

The control sequence KOSE causes the fifth switch S5 to close. In this case, during testing the time evaluation signal KS2 is transported from the logic device LA to the test circuit TC in the testing arrangement PA, instead of being sent to the radio frequency output RFO as in the normal case.

Making a comparison in the test circuit TC between the time evaluating signal KS2 and the earlier-mentioned time interval signal TIS.

Sending a response signal SVS from the test circuit TC to the control circuit CC. In this regard, the response signal SVS is contingent on the result of the comparison made in the preceding step. In the present case, the response signal SVS lacks agreement with the time evaluating signal KS2 and the time interval signal TIS. One of the limits of the time slot which after signal processing has been marked in the time evaluating signal KS2 with the signal sequence SS5 shown in FIG. 4b passes beyond the limits of the intended time slot TS5.

The inventive method thereafter comprises the following steps:

Evaluating the response signal SVS in the control circuit CC. As before mentioned, the response signal has an error in time adaptation.

Sending a time error signal TFS from the control circuit CC to the radio-frequency output, via the logic circuit LC. The time error signal includes a command to the radio-frequency output not to transmit radio signals.

The radio-frequency output RFO prevents the transmission of radio signals.

Figure 5:
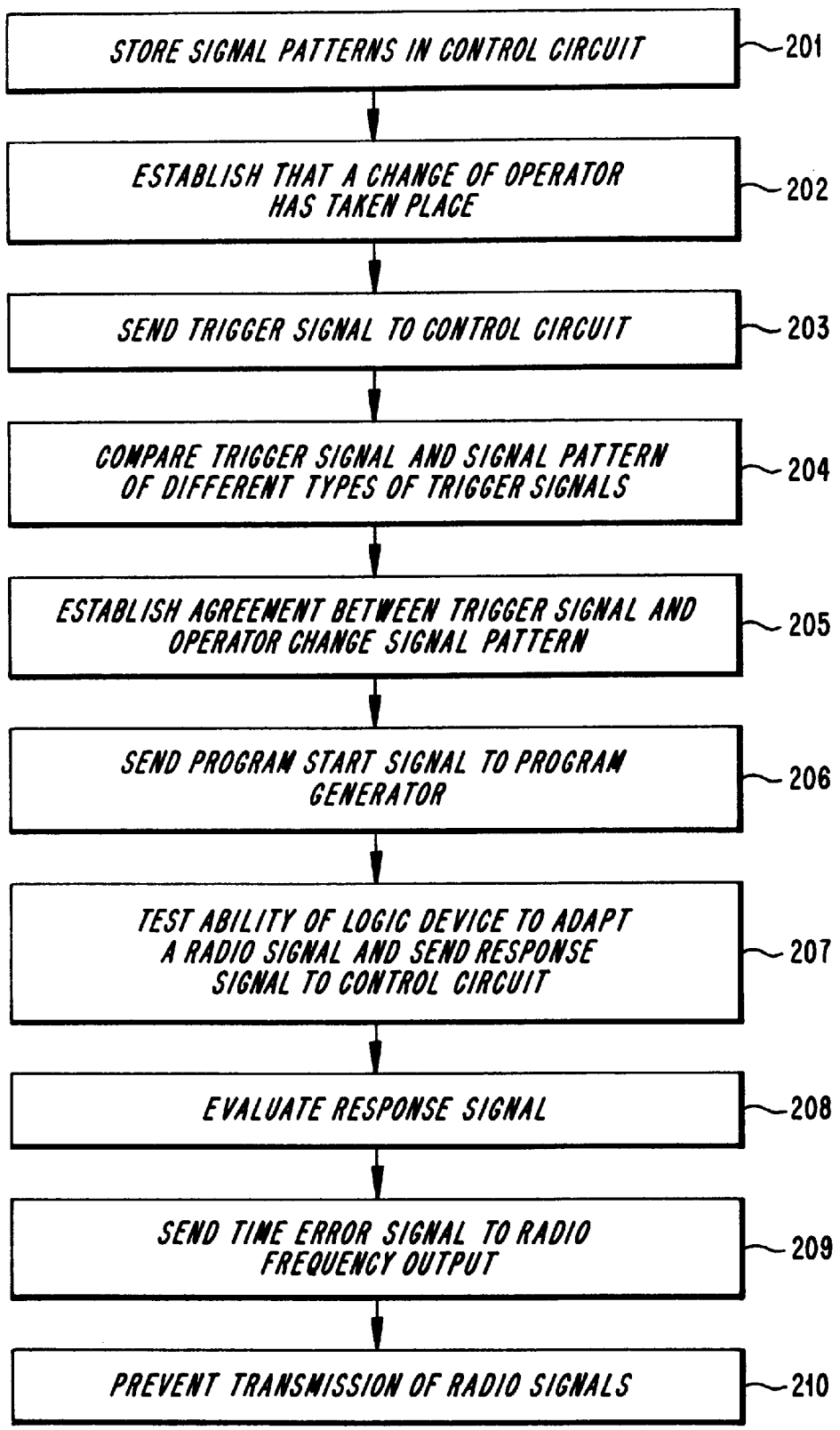
FIG. 5 is a flow sheet which illustrates an inventive method in testing the time relationship of the signal.

FIG. 5 is a flow sheet illustrating the inventive signalling method. The flow sheet and the following simplified description of the method are intended to be taken together with FIG. 4a and its associated text. The flow sheet illustrates those steps that are most essential to the inventive concept. The method is carried out in accordance with the following description and in accordance with FIG. 5:

Storing in the control circuit CC signal patterns which include signal patterns for different types of trigger signals, in accordance with block 201.

Establishing in the trigger device TA that a change of operator has taken place, in accordance with block 202. In the GSM system, this can be achieved by informing the mobile of a changed network code, where the network code signifies the operator identity.

Sending the trigger signal TSI from the trigger device TA to the control circuit CC in the testing arrangement PA. The trigger signal TSI is delivered after establishing in the trigger device TA that the mobile has changed operators, in accordance with block 203.

Making a comparison in the control circuit CC between the trigger signal TSI and the signal pattern for the different types of trigger signals, in accordance with block 204.

Establishing in the control circuit CC an agreement between the trigger signal TSI and the operator-change signal pattern, in accordance with block 205.

Sending the program start signal PST from the control circuit CC to the program generator PRG. The program start signal PST includes start commands for testing the ability of the logic device to adapt the transmission of radio signals from the mobile to the base station within the time slot TS5 indicated in the start signal PST, in accordance with block 206.

Testing the ability of the logic device LA to adapt a radio signal to the indicated time slot, with the aid of the control signal. The resultant response signal SVS is sent to CC, in accordance with block 207.

Evaluating the response signal SVS in the control circuit CC, in accordance with block 208.

Sending the time error signal TFS to the radio-frequency output RFO from the control circuit CC, via the logic circuit LC. The time error signal includes a command to the radio-frequency output not to transmit radio signals, in accordance with block 209. At the same time, the control circuit sends messages to the error indicator IK to the effect that the mobile has a serious fault and must be repaired.

The radio-frequency output RFO prevents the transmission of radio signals, in accordance with block 210.

Figure 6A:
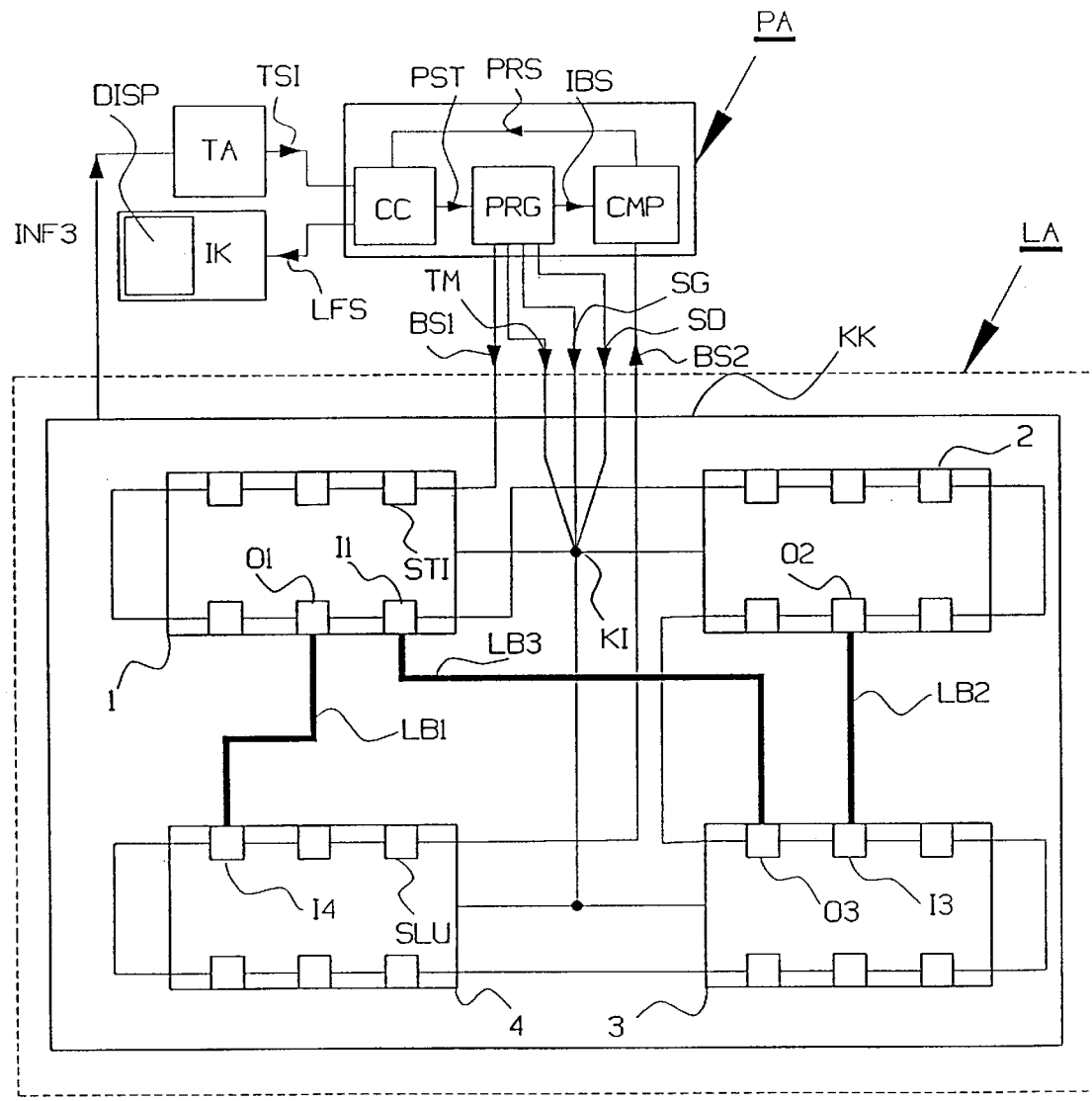
FIG. 6a is a block schematic illustrating that part of the mobile telephone unit which is affected when testing digital components.

FIG. 6a illustrates schematically that part of the earlier-described mobile unit ME which is used in a third embodiment of the inventive method. Described below are the functions of those parts of the mobile unit that are employed in the method. This is followed by a detailed description of the inventive method. The trigger device TA of the FIG. 6a embodiment is connected to the testing arrangement PA. According to the third embodiment, the trigger device TA is a device which checks whether or not an identity module, a so-called SIM card, has been changed. A change of SIN card may place greater demands on the digital hardware of the logic device LA in the mobile unit NE. The inventive method described in more detail further on in the text will be explained with regard to testing the digital hardware in the mobile.

Figure 6B:
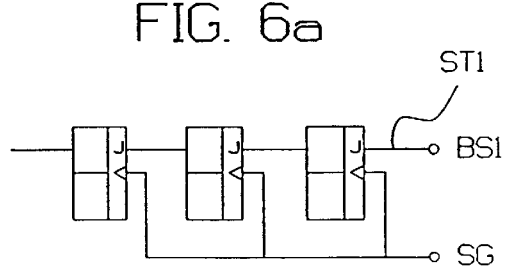
FIG. 6b is a block schematic illustrating a shift register.

The logic device IA is shown in FIG. 6a. The logic device includes a circuit card KK. According to this embodiment, the circuit card includes four digital circuits 1, 2, 3 and 4, so-called ASICs. An ASIC is a customer adapted circuit which is manufactured for a particularly defined purpose, for instance for processing speech signals. In addition to voltage supply and clock signals, the circuits also include inputs and outputs for receiving and transmitting signals respectively. The first circuit 1 includes an input I1 and an output O1. The second circuit 2 includes an output O2. The third circuit 3 includes an input I3 and an output O3. The fourth circuit 4 includes an input I4. The output O1 of the first circuit 1 is connected to the input I4 of the fourth circuit via a first conductor path LB1. The output O2 of the second circuit 2 is connected to the input I3 of the third circuit via a second conductor path LB2. The output O3 of the third circuit is connected to the input I1 of the first circuit via a conductor path LB3. The conductor paths LB1, LB2 and LB3 have been shown in heavy full lines in FIG. 6a. FIG. 6a shows so-called control inputs K1 on each of the circuits 1, 2, 3 and 4, with the aid of a common coupling point. The control inputs are only illustrated schematically in FIG. 6a, and it will be understood that in reality an actual mobile telephone will include a multiple of inputs via which the circuits can be controlled, for instance switched to a test state. The manner in which the circuits are controlled will be made apparent further on in the description. The inputs/outputs I1, O1, O2, I3, O3, I4 of the illustrated circuits 1, 2, 3, 4 with intermediate conductor paths LB1, LB2, LB3 merely constitute a few of the inputs/outputs and conductor paths normally found in the logic device LA. In order to enable a method for testing a breakdown or short-circuit in the conductor paths to be illustrated in a simple fashion, FIG. 6a shows only a few of the inputs/outputs and conductor paths that are normally present. The circuits 1, 2, 3 and 4 can be placed in a test state via the control inputs, by signalling from the program generator PRG. When the circuits are placed in a test state, the circuits are reconfigured and connections on the circuit card between the circuit inputs/outputs are tested at the same time as communication between the circuit inputs/outputs and the internal logic of the circuits is cut off. Each input/output includes a shift register stage. The connections therebetween are shown in FIG. 6a with a light or thin full line that passes through all inputs/outputs of the circuits 1, 2, 3 and 4. A binary character, for instance a logic "one", on a circuit input can therewith be transported to another input/output of the circuit via the shift registers. The shift registers between the inputs/outputs are shown in FIG. 6b. In this regard, a stepping signal SG is used to send a clock pulse to the clock input of the shift registers. A binary character on the signal input of a first shift register is transported from the register input to its output. The binary character is therewith present on the input of the second register. Logic signals can also be transported from an input/output of, e.g., the first circuit 1 to another input/output of the second circuit 2, with the aid of connections between the circuits 1, 2, 3 and 4. The reason for this type of test condition or state will be made apparent further on in the description.

FIG. 6a illustrates signalling in the inventive method. Solid arrows drawn on the connections in FIG. 6a between the signal nodes illustrate the signalling direction between the nodes. The testing arrangement PA and the circuits 1, 2, 3 and 4 in the logic device LA are examples of signal nodes. The method illustrated with the aid of FIG. 6a and which will now be described in more detail comprises controlling the conductor paths LB1, LB2, LB3 on the circuit card KK. This control includes the detection of interruptions or breaks in the conductor paths and/or short-circuiting between said paths. It is particularly important to carry out this type of test after, e.g., changing SIM cards. The change of SIM cards may entitle the user of the mobile to access further services in the telecommunications system. These additional services may mean that previously unused components, e.g. memory circuits in the logic device LA, now become available after changing a SIM card. The method comprises the steps of:

Storing in the control circuit CC signal patterns which include signal patterns for different types of trigger signals that can occur in accordance with the illustrated embodiment.

Sending a card information signal INF3 from the logic device LA to the trigger device, it being established in the trigger device TA that a change of SIM card has been made.

Sending a trigger signal TSI from the trigger device TA to the control circuit CC in the testing arrangement PA. In the case of the illustrated embodiment, the trigger signal TSI is released after establishing that a change of SIM card has taken place.

Making a comparison in the control circuit CC between the trigger signal TSI and the signal patterns for the different types of trigger signals.

Establishing in the control circuit CC agreement between the trigger signal TSI and the signal pattern for a SIM card exchange.

Sending a program start signal PST from the control circuit CC to the program generator PRG. The program start signal PST includes a start command to the program generator PRG ordering the generator to execute a program for testing the conductor paths on the circuit card KK in the logic device LA.

The following method steps illustrate testing which is suitably carried out after establishing the change of SIM cards, in accordance with the invention. The testing method incorporated by the following method steps does not claim to embrace a complete testing method in detail. The testing procedure is designated boundary scan and is described in standard IEEE 1149.1. The method shall only be seen as a means of enabling the inventive principle to be more easily understood:

Sending an ideal bit signal IBS from the program generator PRG to the comparison circuit CMP. The construction of the ideal bit signal will be made more apparent further on in the description.

Sending a test mode signal TM from the testing arrangement PA to each of the circuits 1, 2, 3 and 4 in the logic device LA, via the control inputs KI. This puts the circuits 1, 2, 3 and 4 into a test state.

Sending a first bit of a first bit signal BS1 from the program generator PRG to a start input STI of the first circuit 1. In the present case, the first bit is a logic "ones".

Sending the stepping signal SG from the program generator PRG to the control inputs KI of the circuits 1, 2, 3 and 4 in the logic device LA. The first bit is therewith moved with the aid of the shift registers from the start input STI to an input/output connected to the start input STI via the shift register.

Sending a second bit of the first bit signal BS1 from the program generator PRG to a start input STI. In the present case, the second bit is a logic "zero". The aforedescribed method steps are repeated until all inputs/outputs have been provided with bits from the program generator PRG. The earlier-mentioned first bit has therewith moved from the start input STI of the first circuit 1 via the connections in and between the circuits, through all circuits 1, 2, 3, 4, to a final input SLU on the fourth circuit 4.

In response to a transmission signal SD sent to the control inputs K1 of the circuits 1, 2, 3 and 4, the outputs O1, O2, O3 transmit the bits incoming from the program generator PRG and stored on each output O1, O2, O3 to those conductor paths LB1, LB2 and LB3 connected to the outputs.—transporting the bits stored in the outputs O1, O2, O3 via the conductor paths LB1, LB2 and LB3 to those inputs I4, I3 and I1 that are connected to the outputs via the conductor paths LB1, LB2, LB3. The bits are herewith stored in the shift register stages of the inputs, these stages having earlier been loaded with the inversion of the expected received bit.

Stepping the shift registers to the control inputs KI in the circuits 1, 2, 3 and 4 with the aid of the stepping signal SG from the program generator PRG.

Moving all bits in the inputs/outputs of the circuits one at a time to the final output SLU with repeated stepping signals SG and further to the comparison circuit CMP, where they are stored, as shown by the second bit signal BS2.

Making a comparison in the comparison circuit CMP between the incoming bits from the final output SLU in the fourth circuit 4, and the earlier stored and previously mentioned ideal bit signal IBS. The ideal bit signal includes a bit pattern of the kind which would have been received ideally from the final output SLU, i.e. the pattern that would have arrived at the comparison circuit CMP from the final output SLU if all conductor paths LB1, LB2 and LB3 were whole and no short-circuits existed between the paths.

Sending a product signal PRS from the comparison circuit CMP to the control circuit CC. The product signal PRS is contingent on the comparison made in a preceding step between the ideal bit signal IBS and the second bit signal BS2.

The inventive method then comprises the following further steps:

Evaluating the product signal PRS in the control circuit CC. In the illustrated case, the product signal lacks agreement between the ideal bit signal IBS and the second bit signal BS2.

Sending a logic error signal LFS from the control circuit CC to the error indicator IK.

Displaying an error message on the error indicator, this message reading "HW-ERROR" in the case of the illustrated embodiment.

Figure 7:
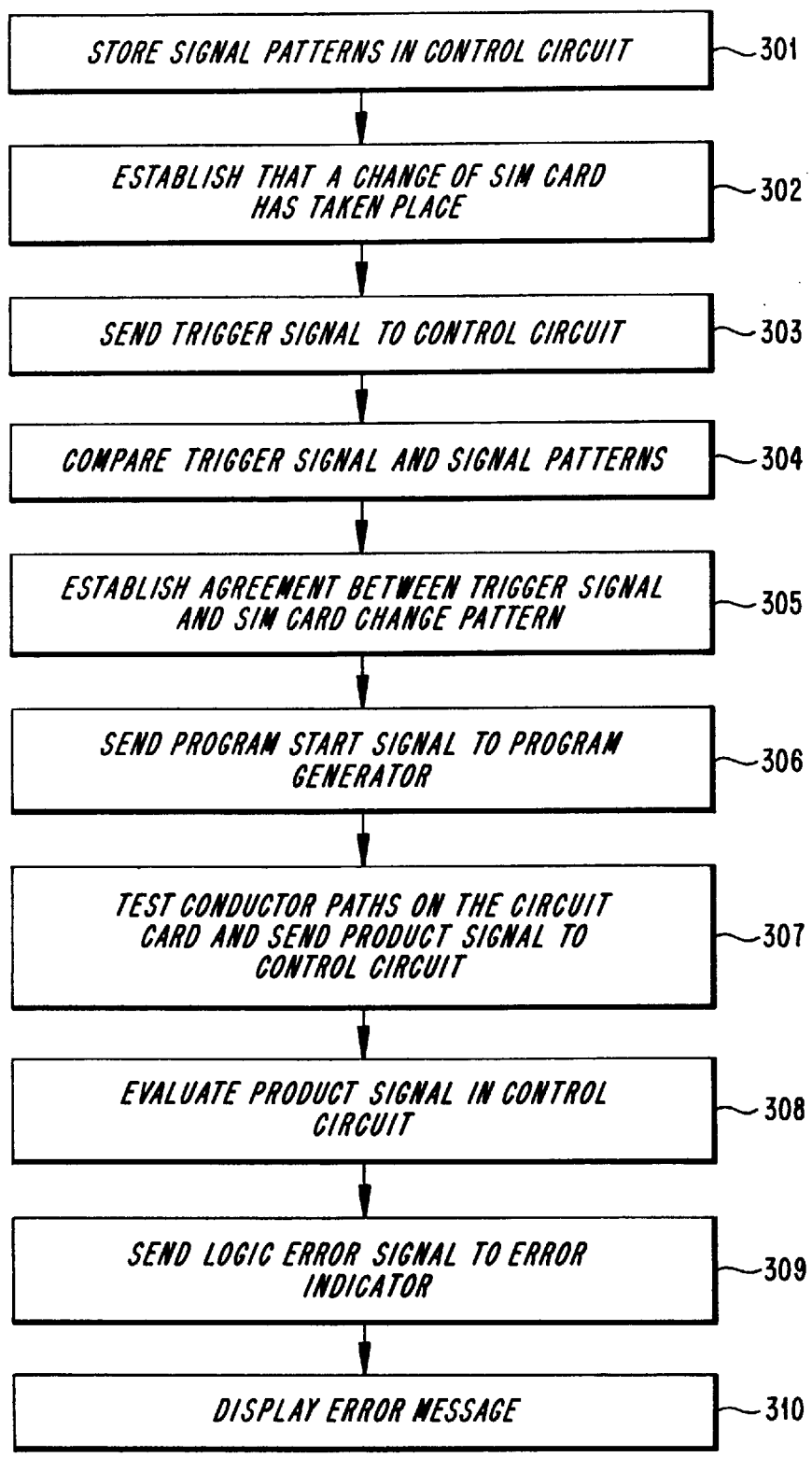
FIG. 7 is a flow sheet illustrating an inventive method in testing the digital components.

FIG. 7 is a flow sheet illustrating the inventive signalling method. The flow sheet and the following simplified description of the method are intended to be read together with FIG. 6a and its associated text. The flow sheet illustrates the steps that are most essential to the inventive concept. The method is carried out in accordance with the following description and in accordance with FIG. 7 and comprises the steps of:

Storing in the control circuit CC signal patterns which include patterns for different types of trigger signals, in accordance with block 301.

Establishing in the trigger device TA that a change of SIM card has taken place, in accordance with block 302.

Sending the trigger signal TSI from the trigger device TA to the control circuit CC in the testing arrangement PA. In the present case, the trigger signal TSI is released after establishing that a change of SIM card has taken place, in accordance with block 303.

Making a comparison in the control circuit CC between the trigger signal TSI and the signal patterns, in accordance with block 304.

Establishing in the control circuit CC an agreement between the trigger signal TSI and the SIM card change pattern, in accordance with block 305.

Sending the program start signal PST from the control circuit CC to the program generator PRG. The program start signal PST includes start commands for testing the conductor paths on the circuit card KK in the logic device LA, in accordance with block 306.

Testing the conductor paths on the circuit card KK in the logic device LA. The product signal PRS is sent to the control circuit CC, in accordance with block 307.

Evaluating the product signal PRS in the control circuit CC, in accordance with block 308.

Sending a logic error signal LFS from the control circuit CC to the error indicator IK, in accordance with block 309.

Displaying "HW-ERROR" on the display DISP on the error indicator IK, in accordance with block 310.

It will be understood that the test described above with reference to FIGS. 6 and 7 is not carried out during an ongoing telephone call. That is to say, if a card is changed immediately after an incoming call is connected the call will have priority over the test. A test of the aforedescribed kind takes typically from 1–2 seconds to complete. The boundary scan also includes other types of component tests, in addition to the aforedescribed test. These tests will not be described in detail, since they are considered to be well-known to the person skilled in this art.

Figure 8:
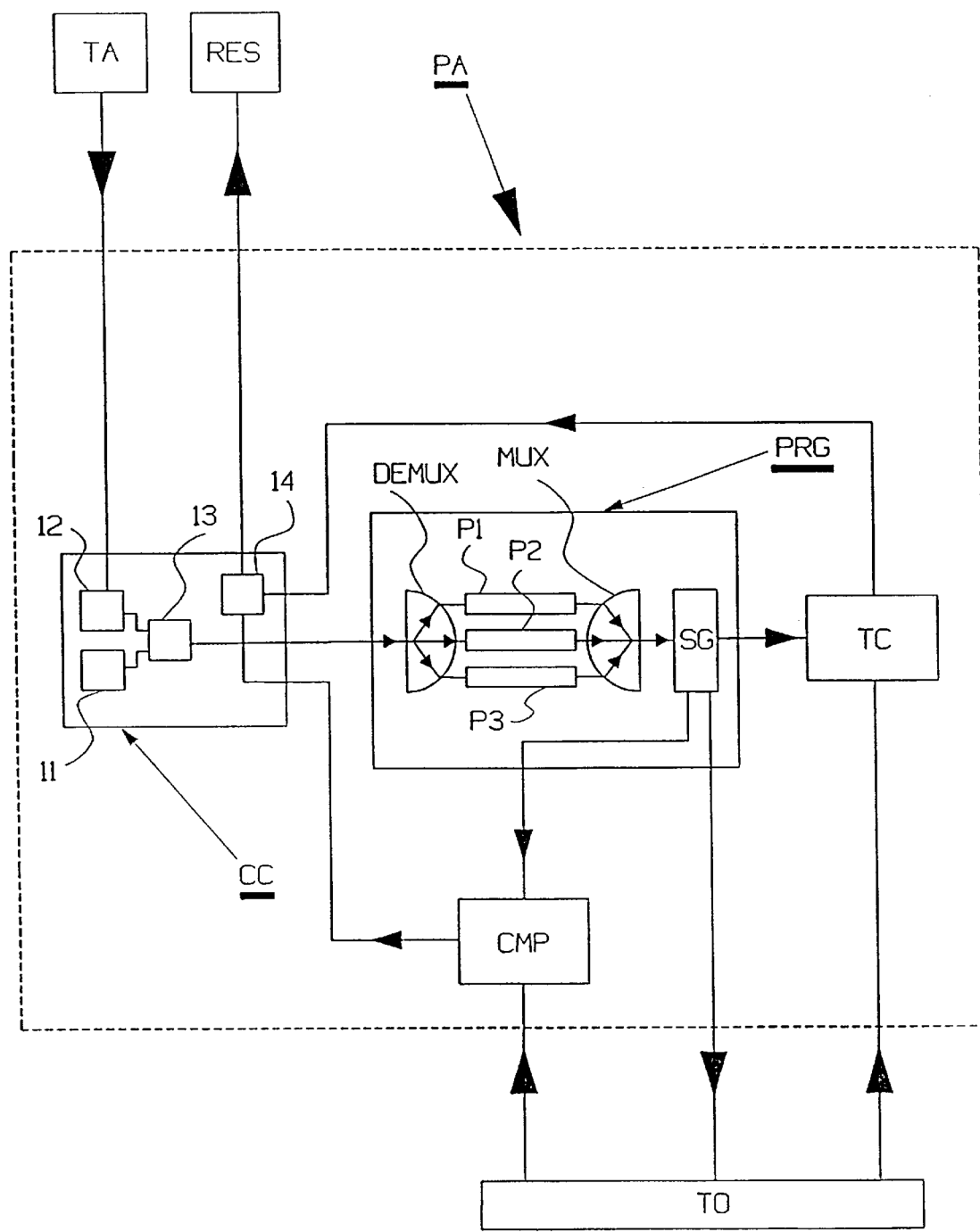
FIG. 8 is a block schematic illustrating an inventive arrangement.

FIG. 8 illustrates an example of an inventive testing arrangement PA. The arrangement PA includes a control circuit CC comprising a memory circuit 11 in which the earlier-mentioned signal patterns are stored. The control circuit CC also includes a receiver 12 which receives and stores a signal from the aforesaid trigger device TA. The control circuit CC includes a comparison circuit 13 which functions to compare the signal in the receiver 12 with the signal patterns in the memory circuit 11. The arrangement PA also includes the program generator PRG which is connected to the comparison circuit 13. The program generator PRG includes different program storage units P1, P2 and P3, in which different programs are stored. Each program storage unit P1, P2 and P3 is connected to its respective output of a demultiplexer DEMUX which leads the signal to one of the program storage units P1, P2, P3 in accordance with the content of the signal received from the comparison circuit 13. Each program storage unit P1, P2 and P3 is connected to its respective input of a multiplexer MUX. An output of the multiplexer MUX is connected to a signal generator SG. The signal generator is connected to the test object TO, the test circuit TC and to the comparison circuit CMP. The signal generator SG includes means for delivering signals to at least one of the units TO, TC or CMP connected to the output, in response to a signal incoming from the program storage units P1, P2 and P3 via the multiplexer MUX. The comparison circuit CMP includes means for comparing a signal from the signal generator SG with another signal incoming from the test object TO. The comparison circuit CMP also includes means for transporting the result of the comparison to the control circuit CC. The test circuit TC includes means for comparing a time signal from the signal generator SG with a time signal incoming from the test object TO. The test circuit TC also includes means for transporting the result of said comparison to the control circuit CC. The aforesaid control circuit CC includes an evaluating means 14 which receives and evaluates signals from the comparison circuit CMP and the test circuit TC, and means for activating a result means RES in accordance with the result of the evaluation.

As before mentioned, the illustrated and described embodiments may be varied and yet still remain within the scope of the invention. Different types of events in the mobile incur different types of tests according to the aforedescribed examples. It is also conceivable that a combination of events will trigger predetermined tests. It is also conceivable for different parts of the testing arrangement, for instance the test circuit TC and the comparison circuit CMP, to be incorporated in one and the same integrated circuit. It is also conceivable to incorporate the testing arrangement in the circuit which it is desired to test. Although the aforedescribed embodiments refer to TDMA-type mobile telephones, it will be understood that other types of mobile telephones may be concerned, for instance FDMA-type mobile telephones. Other types of mobile units are also conceivable, for instance a mobile computer or mobile facsimile apparatus for radio communication. In addition to the test-triggering events mentioned in the described embodiments, it will be understood that several other variants of such events are conceivable, for instance the shutdown of the mobile or periodically occurring trigger signals generated by a time interval counter. In other words, the invention is not restricted to the aforedescribed and illustrated exemplifying embodiments thereof, since modifications can be made within the scope of the following claims.

We claim:

1. A method of automatically monitoring a mobile telephone unit upon the occurrence of at least one predetermined event in the mobile telephone unit, wherein the method comprises the steps of:

storing at least one monitoring program in a program generator in the mobile telephone unit;

storing in a control circuit in the mobile telephone unit signal patterns which represent different types of trigger signals;

sending a trigger signal from a trigger device in the mobile telephone unit to the control circuit, said trigger signal being contingent on the occurrent event;

comparing the trigger signal with the signal patterns;

selecting a monitoring program in accordance with the result of said comparison; and executing the selected monitoring program in the mobile telephone unit.

2. A method of monitoring a mobile telephone unit (ME) according to claim 1, wherein the method comprises the steps of:

generating a predetermined reference signal (IMS; TIS; IBS) in the program generator (PRG);

generating an object signal (MS1; KS1; BS1) in the program generator (PRG);

sending the object signal (LA; TR) from the program generator (PRG) to a test object (LA; TR) in the mobile unit (ME);

generating an object evaluation signal (MS2; KS2; BS2) from the object signal (MS1; KS1; BS1) in the test object (LA; TR); and comparing the object evaluation signal (MS2; KS2; BS2) with the reference signal (IMS; TIS; IBS) in a testing arrangement (PA) in the mobile unit (ME).

3. A method according to claim 2, in which the comparison between the object evaluation signal (MS2; KS2; BS2) and the reference signal (IMS; TIS; IBS) shows lack of agreement, wherein the method comprises the further steps of:

sending an error signal (FMS; LFS) from the testing arrangement (PA) to an indicator (IK) in the mobile unit (ME); and showing the type of error in question on the indicator (IK).

4. A method according to claim 2, wherein the mobile unit (ME) includes a radio-frequency output (RFO) via which the mobile unit transmits radio signals, wherein the comparison between the object evaluation signal (KS2) and the reference signal (TIS) shows lack of agreement, and wherein the method comprises the further steps of:

sending a time error signal (TFS) from the testing arrangement (PA) to the radio-frequency output (RFO); and blocking the radio-frequency output (RFO) in an air interface (RFO, RFI) of the mobile unit so as to prevent the transmission of radio signals from said mobile unit.

5. A method according to claim 1, wherein the predetermined event includes determining a maximum permitted number of bit errors.

6. A method according to claim 1, wherein the predetermined event includes a change of teleoperator.

7. A method according to claim 1, wherein the predetermined event includes the change of a subscriber identity card.

8. A method according to claim 1, wherein the predetermined event includes the release of a call connection.

9. A method according to claim 1, wherein the predetermined event includes shutting down the mobile unit.

10. A method according to claim 1, wherein the predetermined event is periodic and is triggered by a time interval counter.

11. A mobile telecommunications unit provided with means for monitoring its function in accordance with events that concern the mobile telecommunications unit, wherein said mobile telecommunications unit comprises:

means for storing at least one monitoring program;

means for storing signal patterns, which represent different types of trigger signals;

means for automatically generating an event-dependent trigger signal in the mobile telecommunications unit in accordance with the occurrence of a given event;

means for comparing the trigger signal with the signal patterns;

means for selecting a monitoring program, said selection being dependent on the result of said comparison; and means for executing the selected monitoring program in the mobile telecommunications unit.

* * * * *